US010443213B2

(12) United States Patent
Hashimoto

(10) Patent No.: US 10,443,213 B2
(45) Date of Patent: Oct. 15, 2019

(54) HYDRAULIC CIRCUIT FOR CONSTRUCTION MACHINE

(71) Applicant: SUMITOMO(S.H.I.) CONSTRUCTION MACHINERY CO., LTD., Tokyo (JP)

(72) Inventor: Hirofumi Hashimoto, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 123 days.

(21) Appl. No.: 15/686,369

(22) Filed: Aug. 25, 2017

(65) Prior Publication Data

US 2018/0002897 A1 Jan. 4, 2018

Related U.S. Application Data

(63) Continuation of application No. 14/536,776, filed on Nov. 10, 2014, now Pat. No. 9,903,097, which is a (Continued)

(30) Foreign Application Priority Data

Jun. 15, 2012 (JP) ................................ 2012-136351

(51) Int. Cl.
*F16K 31/02* (2006.01)
*E02F 9/22* (2006.01)
(Continued)

(52) U.S. Cl.
CPC .......... *E02F 9/2228* (2013.01); *E02F 9/2267* (2013.01); *E02F 9/2282* (2013.01);
(Continued)

(58) Field of Classification Search
CPC ..... E02F 9/2228; E02F 9/2267; E02F 9/2282; E02F 9/2285; E02F 9/2292; E02F 9/2296;
(Continued)

(56) References Cited

U.S. PATENT DOCUMENTS 3,146,593 A * 9/1964 Stacey ...................... E02F 3/32 60/421
3,258,926 A * 7/1966 Junck ...................... E02F 3/651 91/519

(Continued)

FOREIGN PATENT DOCUMENTS

DE 19651510 10/1997
EP 0533953 3/1993

(Continued)

OTHER PUBLICATIONS

International Search Report for PCT/JP2013/056194 dated Apr. 2, 2013.

*Primary Examiner* — Minh Q Le
(74) *Attorney, Agent, or Firm* — IPUSA, PLLC

(57) ABSTRACT

A direction control valve group for a construction machine that controls an amount of pressure oil supplied to a hydraulic actuator from a hydraulic pump that discharges the pressure oil is provided. The direction control valve includes a cylinder port that supplies the pressure oil to the hydraulic actuator, a bridge passage that is switchably connected and disconnected to the cylinder port according to a change in position of a first spool, and an internal passage that supplies the pressure oil discharged from the hydraulic pump to the bridge passage. The first spool is provided in the internal passage.

18 Claims, 7 Drawing Sheets

Related U.S. Application Data continuation of application No. PCT/JP2013/056194, filed on Mar. 6, 2013.

(51) Int. Cl.
*F15B 11/16* (2006.01)
*F15B 13/04* (2006.01)
*F15B 11/02* (2006.01)

(52) U.S. Cl.
CPC .......... *E02F 9/2285* (2013.01); *E02F 9/2292* (2013.01); *E02F 9/2296* (2013.01); *F15B 11/02* (2013.01); *F15B 11/16* (2013.01); *F15B 13/0402* (2013.01); *F15B 2211/20576* (2013.01); *F15B 2211/30525* (2013.01); *F15B 2211/30565* (2013.01); *F15B 2211/3116* (2013.01); *F15B 2211/31582* (2013.01); *F15B 2211/41554* (2013.01); *F15B 2211/45* (2013.01); *F15B 2211/7135* (2013.01); *F15B 2211/7142* (2013.01); *F15B 2211/78* (2013.01); *F15B 2211/781* (2013.01)

(58) Field of Classification Search
CPC ...... F15B 11/02; F15B 11/16; F15B 13/0402; F15B 2211/30525; F15B 2211/45; F15B 2211/78; F15B 2211/20576; F15B 2211/30565; F15B 2211/3116; F15B 2211/31582; F15B 2211/41554; F15B 2211/7135; F15B 2211/7142; F15B 2211/781
USPC .......................................... 137/596.17, 487.5
See application file for complete search history.

(56) References Cited

U.S. PATENT DOCUMENTS

| | | | | | | |
|---|---|---|---|---|---|---|
| 3,350,986 | A | * | 11/1967 | Berta | B62D 11/18 60/472 |
| 3,777,492 | A | * | 12/1973 | Boydell | F04B 49/002 417/218 |
| 3,785,156 | A | * | 1/1974 | Junck | C09B 43/02 60/421 |
| 3,788,077 | A | * | 1/1974 | Johnson | F15B 11/02 60/452 |
| 3,800,669 | A | | 4/1974 | Distler | |
| 3,935,792 | A | * | 2/1976 | Dezelan | E02F 9/2239 91/438 |
| 4,186,771 | A | | 2/1980 | Matsumoto | |
| 4,256,142 | A | * | 3/1981 | Hancock | F15B 11/16 137/596 |
| 4,561,462 | A | * | 12/1985 | Hashimoto | E02F 9/2239 137/596.13 |
| 4,875,337 | A | | 10/1989 | Sugiyama et al. | |
| 5,083,428 | A | | 1/1992 | Kubomoto et al. | |
| 5,560,387 | A | | 10/1996 | Devier et al. | |
| 5,701,796 | A | * | 12/1997 | Takano | F15B 11/16 91/512 |
| 5,852,934 | A | | 12/1998 | Chung et al. | |
| 5,921,165 | A | * | 7/1999 | Takahashi | E02F 9/226 91/426 |
| 5,940,997 | A | | 8/1999 | Toyooka et al. | |
| 5,950,430 | A | | 9/1999 | Tohji et al. | |
| 5,970,709 | A | | 10/1999 | Tohji | |
| 6,430,992 | B1 | | 8/2002 | Tohji | |
| 6,619,037 | B1 | | 9/2003 | Toyooka et al. | |
| 6,708,490 | B2 | | 3/2004 | Toji et al. | |
| 6,758,128 | B2 | | 7/2004 | Iga et al. | |
| 7,178,333 | B2 | | 2/2007 | Oka | |
| 7,594,395 | B2 | | 9/2009 | Oka et al. | |
| 8,505,289 | B2 | | 8/2013 | Harsia | |
| 8,607,557 | B2 | | 12/2013 | Ikeda et al. | |
| 8,671,986 | B2 | * | 3/2014 | Tanino | E02F 9/226 137/625.69 |
| 2003/0230082 | A1 | * | 12/2003 | Wook Kim | E02F 9/2203 60/429 |
| 2004/0031173 | A1 | * | 2/2004 | Yoshino | E02F 9/2203 37/348 |
| 2004/0237771 | A1 | * | 12/2004 | Kim | E02F 9/226 91/461 |
| 2004/0244232 | A1 | | 12/2004 | Toji | |
| 2008/0202608 | A1 | * | 8/2008 | Tschida | F15B 13/0402 137/554 |
| 2010/0000211 | A1 | * | 1/2010 | Ikeda | E02F 9/2232 60/422 |
| 2012/0067443 | A1 | | 3/2012 | Horii | |
| 2012/0198831 | A1 | | 8/2012 | Kodaka et al. | |
| 2013/0125539 | A1 | * | 5/2013 | Kobayashi | E02F 9/2207 60/413 |
| 2016/0312442 | A1 | * | 10/2016 | Egawa | E02F 9/2075 |
| 2016/0312443 | A1 | * | 10/2016 | Egawa | E02F 9/123 |
| 2017/0306989 | A1 | * | 10/2017 | Coolidge | F15B 11/161 |
| 2018/0334784 | A1 | * | 11/2018 | Fukuda | E02F 9/2239 |

FOREIGN PATENT DOCUMENTS

| | | |
|---|---|---|
| EP | 0816576 | 1/1998 |
| EP | 1191234 | 3/2002 |
| EP | 1316650 | 6/2003 |
| JP | S61-038204 | 2/1986 |
| JP | H02-186106 | 7/1990 |
| JP | H10-018359 | 1/1998 |
| JP | H11-257302 | 9/1999 |
| JP | H11-303809 | 11/1999 |
| JP | 2000-046015 | 2/2000 |
| JP | 2006-132700 | 5/2006 |
| JP | 2007-192344 | 8/2007 |

* cited by examiner

HYDRAULIC CIRCUIT FOR CONSTRUCTION MACHINE

RELATED APPLICATION

The present application is a continuation application and claims priority under 35 U.S.C. 120 to U.S. patent application Ser. No. 14/536,776 filed on Nov. 10, 2014, which claims benefit under 35 U.S.C. 120 and 365(c) of PCT International Application No. PCT/JP2013/056194, filed on Mar. 6, 2013 and designating the U.S., which claims priority to Japanese Patent Application No. 2012-136351, filed on Jun. 15, 2012. The entire contents of the foregoing applications are incorporated herein by reference.

BACKGROUND

Technical Field

The present invention relates to a hydraulic circuit for a construction machine.

Description of Related Art

Among construction machinery, there is one that performs controls for returning a portion of pressure oil discharged from a hydraulic pump to a hydraulic oil tank (bleed-off control). In order to perform the bleed-off control, a construction machine may have a gap (bleed opening) provided in a spool of a direction control valve for returning the pressure oil. By changing the opening area of the bleed opening, the construction machine performs bleed control.

With a hydraulic circuit for a construction machine according to a related art, a spool of a direction control valve Vm is provided with multiple bleed openings Sbo as illustrated in, for example, FIG. 6. In this case, the hydraulic circuit performs bleed-off control by changing the opening area of the bleed opening Sbo.

SUMMARY

According to an embodiment of the present invention, there is provided a direction control valve group for a construction machine that controls an amount of pressure oil supplied to a hydraulic actuator from a hydraulic pump that discharges the pressure oil. The direction control valve includes a cylinder port that supplies the pressure oil to the hydraulic actuator, a bridge passage that is switchably connected and disconnected to the cylinder port according to a change in position of a first spool, and an internal passage that supplies the pressure oil discharged from the hydraulic pump to the bridge passage. The first spool is provided in the internal passage.

DETAILED DESCRIPTION

Figure 6:
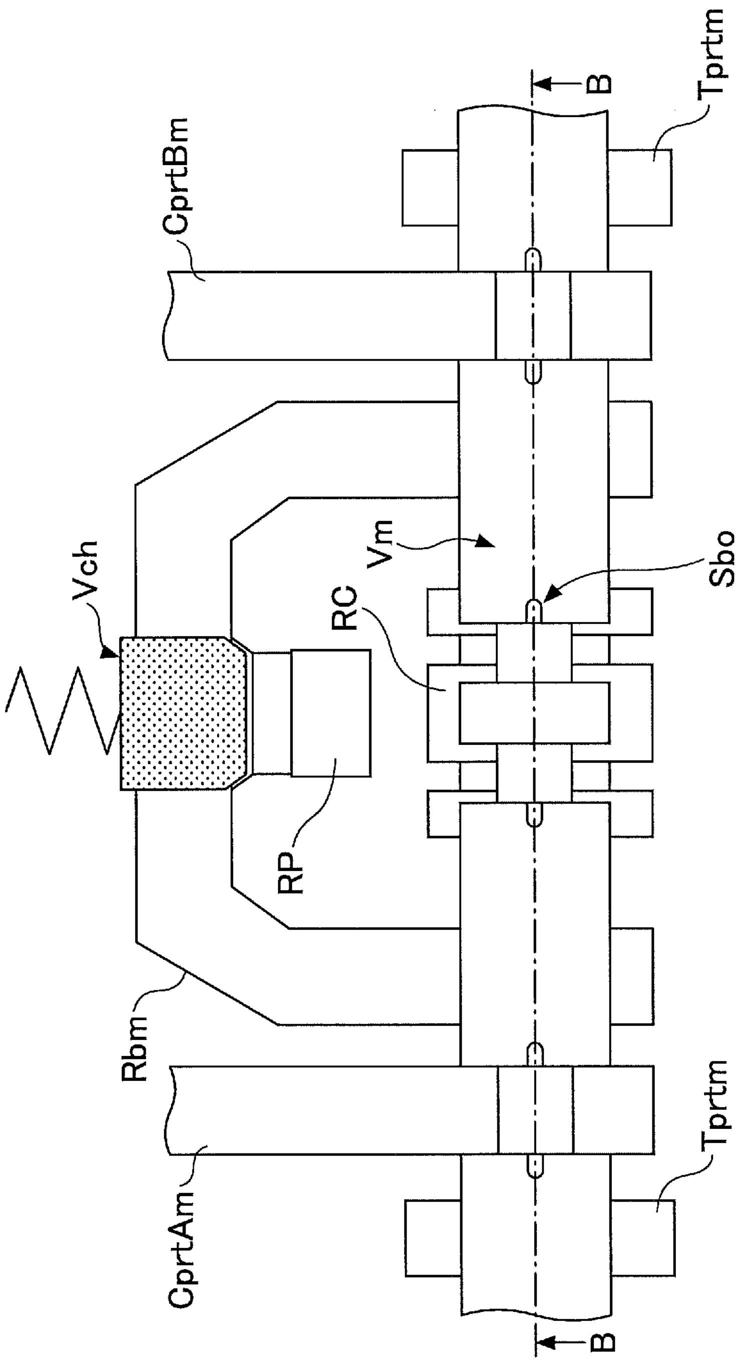
FIG. 6 is a schematic diagram for describing another example of a direction control valve of a hydraulic circuit.
Figure 7:
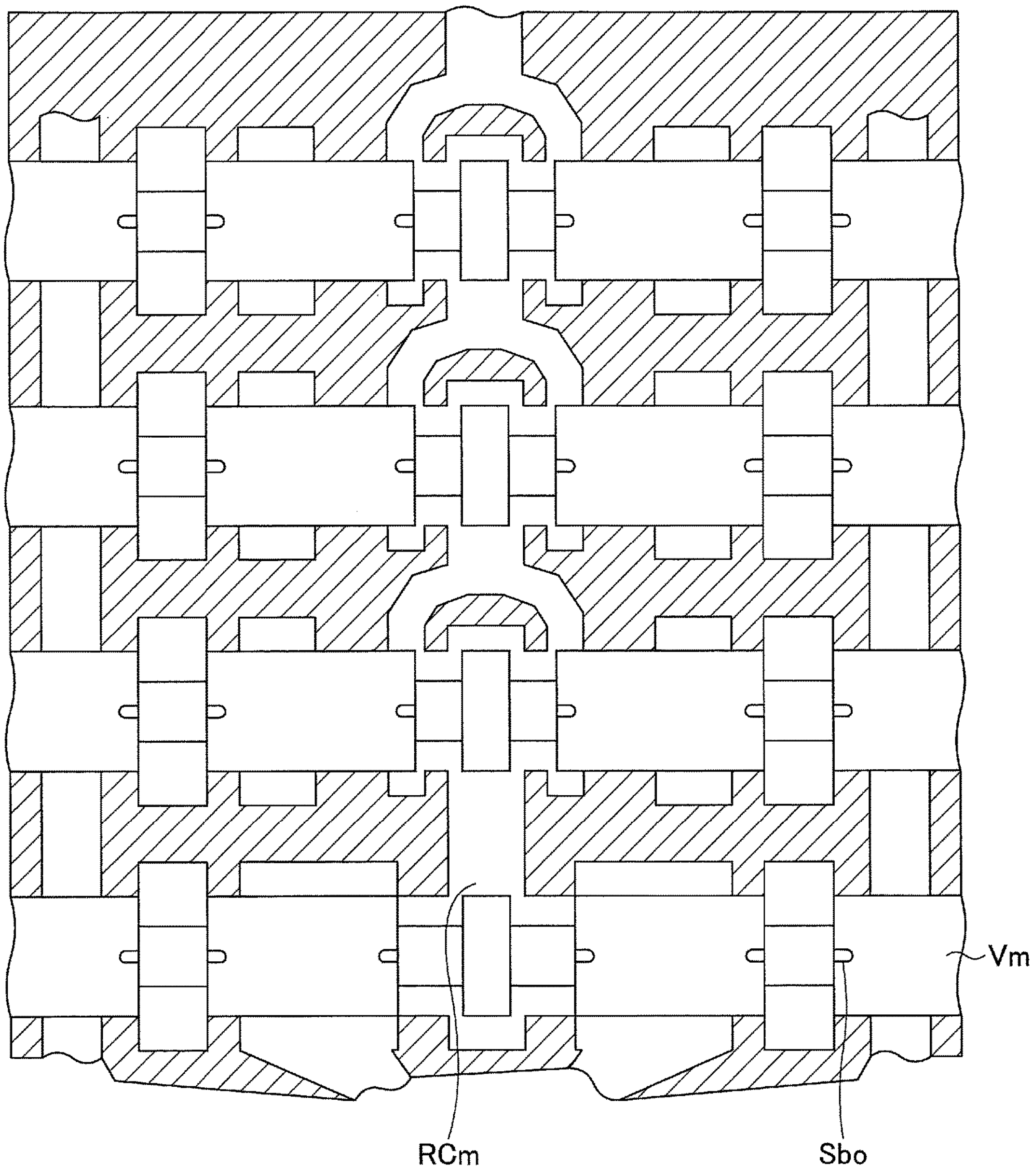
FIG. 7 is a schematic cross-sectional view for describing another example of a cross section (cross section along BB of FIG. 6) of a direction control valve of a hydraulic circuit.

However, in the hydraulic circuit for the construction machine disclosed in, for example, Japanese Unexamined Patent Publication No. 11-257302, pressure loss caused by pressure oil passing a center bypass passage may increase due to the bleed opening provided in each of the multiple spools of the direction control valve Vm. For example, with the hydraulic circuit of the related art arranged with multiple direction control valves Vm as illustrated in FIG. 7, it is necessary to provide multiple bleed openings Sbo to corresponding spools of the direction control valves Vm. Therefore, the shape of the center bypass passage RCm may become complicated (many bending parts) and the pressure loss caused by the pressure oil passing the center bypass passage RCm may increase. Further, with the hydraulic circuit of the related art, the size of the spool of the direction control valve Vm may become large in its longitudinal direction. Further, in a case of providing a parallel passage (see, for example, RP in FIG. 6) with the hydraulic circuit of the related art, the size of the direction control valve Vm (or bridge passage Rb) may become large.

Under the above circumstances, the following embodiment of the present invention provides a direction control valve group for a construction machine that is capable of more effectively controlling the amount of pressure oil supplied to a hydraulic cylinder from a hydraulic pump that discharges the pressure oil.

In the following, embodiment(s) of the present invention are described with reference to the drawings. It is to be noted that, in the explanation of the drawings, the same members and components are given the same reference numerals, and explanations are not repeated. Further, the drawings are not aimed to illustrate the correlative proportion among the members and components. Therefore, the actual dimensions may be determined by one of ordinary skill in the art in light of the non-restrictive embodiments below.

Next, the present invention is described by referring to a construction machine 100 including a hydraulic circuit 20 according to an embodiment of the present invention. It is to be noted that the present invention may be applied to a construction machine including a center bypass passage (center bypass line) other than the below-described embodiments as long as the construction machine causes a portion of pressure oil to flow back to a tank (bleed-off control). The construction machine that can be applied with the present invention may include, for example, a hydraulic shovel, a crane truck, a bulldozer, a wheel loader, a dump truck, a pile driver, a pile extractor, a water jet machine, a dirt waste water treatment facility, a grout mixer, a deep foundation excavating machine, or a perforating machine.

<Configuration of Construction Machine>

A configuration of the construction machine 100 that can use the present invention is described with reference to FIG. 1. In this embodiment, "construction machine" refers to a machine that performs a desired operation by using a hydraulic actuator.

Figure 1:
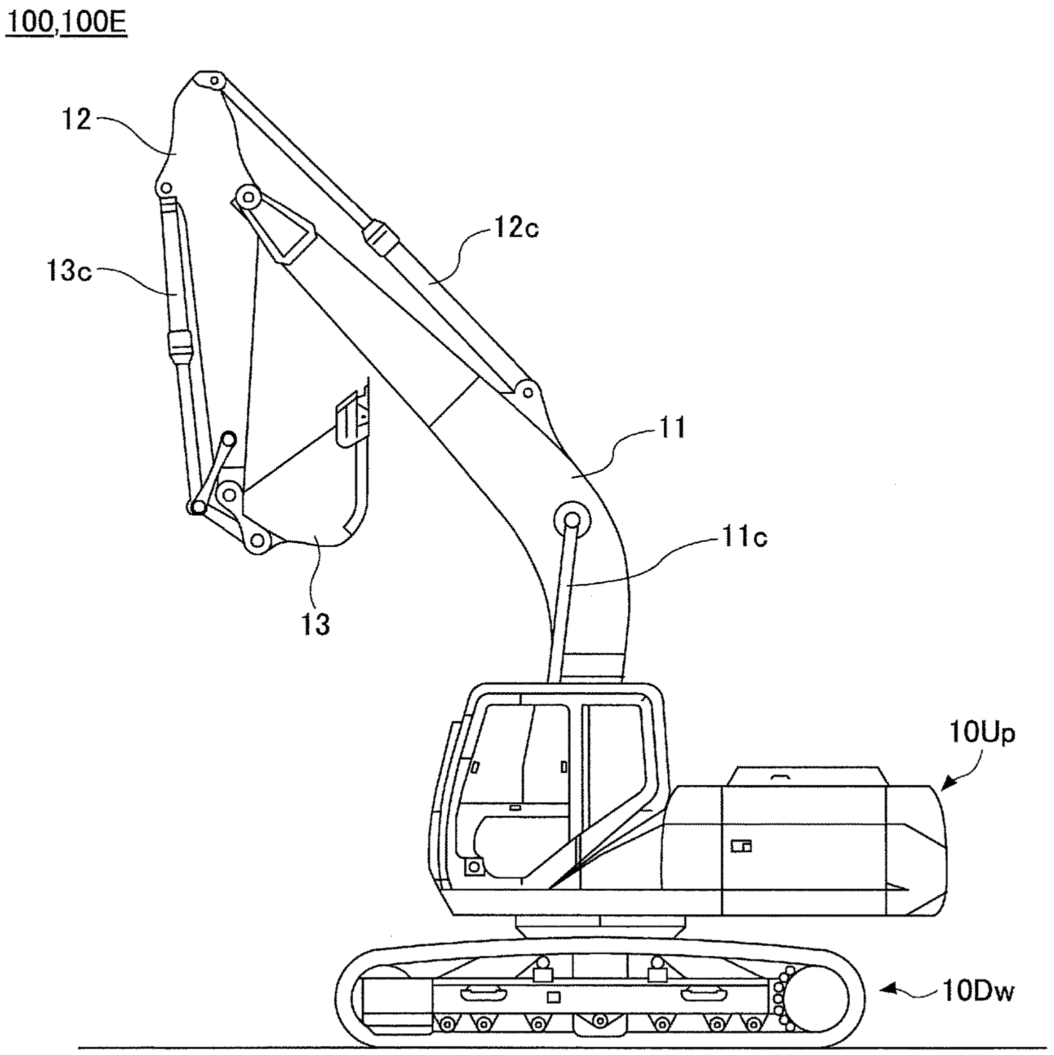
FIG. 1 is a schematic external view for describing an example of a construction machine according to an embodiment of the present invention.

As illustrated in FIG. 1, the construction machine 100 has a hydraulic actuator provided with a boom 11 having its base end part axially supported to an upper swiveling member 10Up, an arm 12 is axially supported to a tip of the boom 11, and a bucket 13 axially supported to a tip of the arm 12.

The construction machine 100 causes a boom cylinder 11*c* to expand/contract in its longitudinal direction by supplying hydraulic oil to the boom cylinder 11*c* positioned in a space between the boom 11 and the upper swiveling member 10Up. In this case, the boom 11 is driven in a vertical direction by the expansion/contraction of the boom cylinder 11*c*. Further, the construction machine 100 controls the hydraulic oil supplied to the boom cylinder 11*c* with a boom direction control valve (see, for example, Vb1, Vb2 of below-described FIG. 2) that is controlled in response to an operation amount (and an operation direction) of an operator (driver, worker). As a result, the construction machine 100 performs a desired movement in response to the operator's operation amount and the like.

Similar to the case of the boom 11, the construction machine 100 drives the arm 12 and the bucket 13 by the expansion/contraction of the arm cylinder 12*c* and the bucket cylinder 13*c*. Similar to the case of the boom cylinder 11*c*, the construction machine 100 controls the hydraulic oil supplied to the arm cylinder 12*c* and the bucket cylinder 13*c* with a boom direction control valve (see, for example, Va1, Va2 of FIG. 2).

Further, the construction machine 100 performs driving (traveling front/back/right/left) and rotating (such as swiveling) of the main body of the construction machine 100 itself by using, for example, a wheel and a swiveling apparatus. The construction machine 100 uses, for example, a running direction control valve (see, for example, Vt1, Vt2, Vst of FIG. 2) and performs running or the like of the construction machine 100 in response to the operator's operation amount and the like.

The construction machine 100 that can use the present invention also includes a hydraulic circuit (described below) 20 that supplies hydraulic oil (pressure oil) from a hydraulic pump to a hydraulic actuator and a control device (described below) 30 that controls an operation of each configuration of the construction machine 100.

Next, the hydraulic circuit 20 and the control device 30 of the construction machine 100 according to an embodiment of the present invention are described more specifically.

(Hydraulic Circuit of Construction Machine)

Figure 2:
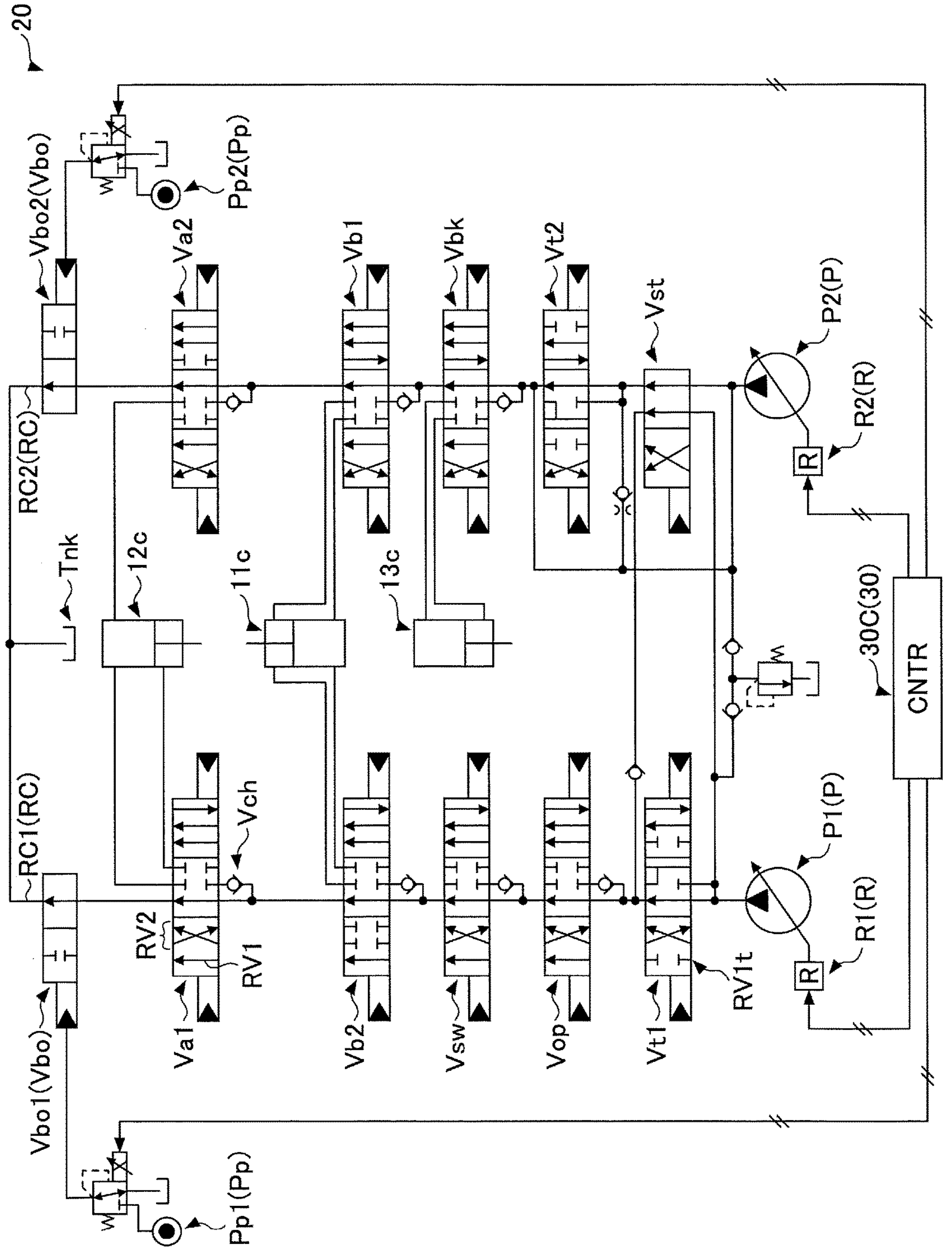
FIG. 2 is a hydraulic circuit diagram for describing an example of a hydraulic circuit of a construction machine according to an embodiment of the present invention.

The hydraulic circuit 20 of the construction machine 100 according to an embodiment of the present invention is described by using FIG. 2. Here, a solid line illustrated in FIG. 2 indicates an oil passage (passage for pressure oil). Further, a solid line that is added with "//" indicates an electric control system.

The hydraulic circuit that can be applied with the present invention is not limited to the one illustrated in FIG. 2. That is, as long as a center bypass passage is included and a cut valve is provided in the center bypass passage on a downstream side of a direction control valve, the present invention may also be applied to other hydraulic circuits.

Further, although two hydraulic pumps are provided in the hydraulic circuit 20 illustrated in FIG. 2, the hydraulic circuit that can be applied with the present invention is not limited to one that has two hydraulic pumps. That is, the present invention may be applied to a hydraulic pump (construction machine) having one pump or three or more pumps.

As illustrated in FIG. 2, the hydraulic circuit 20 of the construction machine 100 according to an embodiment of the present invention includes: two hydraulic pumps P (first hydraulic pump P1, second hydraulic pump P2) that are mechanically connected to an output shaft of a power source (not illustrated) such as a prime mover, an engine, or a motor; two center bypass passages RC (first center bypass passage RC1, second center bypass passage RC2) to which pressure oil (hydraulic oil) discharged from each of the two hydraulic pumps P is supplied; a direction control valve (e.g., first running direction control valve Vt1) that controls the hydraulic actuator (e.g., boom 11 of FIG. 1); and a direct-advance running direction control valve (direct running valve) Vst. Further, the hydraulic circuit 20 includes bleed-off valves Vbo (first bleed-off valve Vbo1, second bleed-off valve Vbo2) positioned downstream (e.g., most downstream) of the center bypass passages Rc. Further, the hydraulic circuit 20 includes pilot pumps Pp (first pilot pump Pp1, second pilot pump Pp2) that generate pressure (discharge pressure oil) to be input to the pilot ports (control ports) of the bleed-off valves Vbo.

The hydraulic circuit 20 of this embodiment has the direction control valve (e.g., Vt1) serially provided to the center bypass passage RC and the bleed-off valve Vbo positioned downstream of the center bypass passage RC. More specifically, the hydraulic circuit 20 has the first running direction control valve (e.g., leftward running direction control valve) Vt1, an auxiliary direction control valve Vop, a swiveling direction control valve Vsw, a second boom direction control valve Vb2, a first arm direction control valve Va1, and the first bleed-off valve Vbo1 serially provided to the first center bypass passage RC1 corresponding to the first hydraulic pump P1. Further, the hydraulic circuit 20 has the second running direction control valve (e.g., rightward running direction control valve) Vt2, a bucket direction control valve Vbk, the first boom direction control valve Vb1, the second arm direction control valve Vat, and the second bleed-off valve Vbo2 serially provided to the second center bypass passage RC2 corresponding to the second center bypass passage RC2. Further, the hydraulic circuit 20 has the running valve Vst positioned on an upstream side of the second center bypass passage RC2.

In other words, the hydraulic circuit 20 has multiple direction control valves serially provided to the center bypass passages RC. Further, the hydraulic circuit 20 has the direction control valves provided in tandem by serially providing the multiple direction control valves to the two corresponding center bypass passages RC1, RC2.

In the following description, a group constituted of multiple direction control valves provided in tandem to the center bypass passage RC is hereinafter referred to as "direction control valve group".

The hydraulic circuit 20 of this embodiment inputs a remote control pressure (secondary pressure of remote control valve), which is generated in response to operation information (e.g., information pertaining to operation amount, information pertaining to operation direction) corresponding to the operator's operations of an operation lever, to a direction control valve (e.g., Vt1) corresponding to the operated operation lever. In this case, the direction control valve switches the position of a spool in response to the remote control pressure guided to both ends of the spool (flow amount control spool) and controls a flow amount and a direction (operation control) of pressure oil (hydraulic oil).

Further, the hydraulic circuit 20 of this embodiment uses the bleed-off valve Vbo (e.g., Vbo1) positioned downstream of the center bypass passage RC (e.g., RC1) to return a flow of a portion (remainder) of the pressure oil discharged from the hydraulic pump P (e.g., P1) to a hydraulic oil tank Tnk (control of bleed-off). Thereby, the construction machine 100 can control the flow amount of hydraulic oil (pressure oil) supplied to the hydraulic cylinder (e.g., 11*c*) and control the driving (movement) of the hydraulic actuator (e.g., 11 of FIG. 1).

In this embodiment, the bleed-off valve Vbo has an unloading position at which the area of its opening becomes largest and a blocking position at which the area of its opening becomes zero. The bleed-off valve Vbo uses the (pressure of) the pressure oil of the pilot pump Pp controlled by the below-described control device 30 to switch from the unloading position and the blocking position and change the area of the opening. Thereby, the bleed-off valve Vbo can return the pressure oil to the working tank Tnk for a desired flow amount in correspondence with the changed area of the opening.

<Internal Passage of Direction Control Valve>

An internal passage RV of the direction control valve provided in the hydraulic circuit 20 of the construction machine 100 according to an embodiment of the present invention is described below.

The hydraulic circuit 20 of this embodiment includes a direction control valve group (multiple direction control valves). Further, the direction control valve of this embodiment has an internal passage RV that includes a first internal passage from which supplied pressure oil flows out to the center bypass passage RC and a second internal passage that supplies supplied pressure oil to the hydraulic actuator. That is, each of the multiple direction control valves constituting the direction control valve group includes the first internal passage and the second internal passage.

Further, the center bypass passage RC and the first internal passage can form a parallel passage by allowing the pressure oil discharged from the hydraulic pump to flow to the center bypass passage RC downstream of the direction control valve. For example, the shape of the below-described embodiment (FIGS. 4A-4C) may be used as the shape of the internal passage of the direction control valve (shape of spool).

The first internal passage according to an embodiment of the present invention is an internal passage (e.g., RV1 of FIG. 2) for supplying pressure oil to the bleed-off valve Vbo. The first internal passage allows the pressure oil discharged from the hydraulic pump P connected to the upstream of the center bypass passage RC to flow out to the center bypass passage RC that is downstream with respect to the direction control valve (e.g., Va1).

Even in a case where the position of the spool of the direction control valve is switched, the first internal passage of this embodiment does not have its opening fully closed. That is, the first internal passage of this embodiment has substantially the same passage area regardless of the spool position of the direction control valve. It is to be noted that "substantially the same passage area" means that the effective passage area for actually allowing pressure oil to pass through does not significantly change relative to the increase/decrease of the passage area that changes in accordance with the displacement of the spool position.

Thereby, the hydraulic circuit 20 according to an embodiment of the present invention can form a parallel passage with the center bypass passage RC and the first internal passage. Further, the hydraulic circuit 20 according to an embodiment of the present invention can form a parallel passage corresponding to the passage area of the first internal passage. Further, the hydraulic circuit 20 according to an embodiment of the present invention can supply pressure oil to the direction control valve group (multiple direction control valves) only from the formed parallel passage.

Among the multiple direction control valves, the running direction control valves (e.g., Vt1, Vt2 of FIG. 2) may be configured to fully close the first internal passage (e.g., RV1*t* of FIG. 2). Thereby, running stability (flow amount of hydraulic oil required for running) can be ensured for the construction machine 100 (hydraulic circuit 20 thereof) during its running.

Further, the first internal passage (spool thereof) of the direction control valve of this embodiment has no gap for returning pressure oil to the hydraulic oil tank (hereinafter referred to as "bleed opening"). As described above, the hydraulic circuit 20 of this embodiment performs bleed-off control (uniform bleed-off control) by using the bleed-off valve Vbo positioned at the most downstream side of the center bypass passage RC.

The second internal passage according to an embodiment of the present invention is an internal passage (e.g., RV2 of FIG. 2) for supplying pressure oil to the hydraulic cylinder (e.g., arm cylinder 12*c* of FIG. 2). The second internal passage supplies pressure oil discharged from the hydraulic pump P to the hydraulic cylinder (e.g., arm cylinder 12*c* of FIG. 2). In a case where the position of the spool of the direction control valve is changed by input of remote control pressure, the second internal passage of this embodiment changes the path of its internal passage to change the flow amount (operation amount) and direction (operation direction) of the pressure oil (hydraulic oil) supplied to the hydraulic cylinder. Thereby, the direction control valve (construction machine 100) can control the movement of the hydraulic cylinder (hydraulic actuator).

Figure 3:
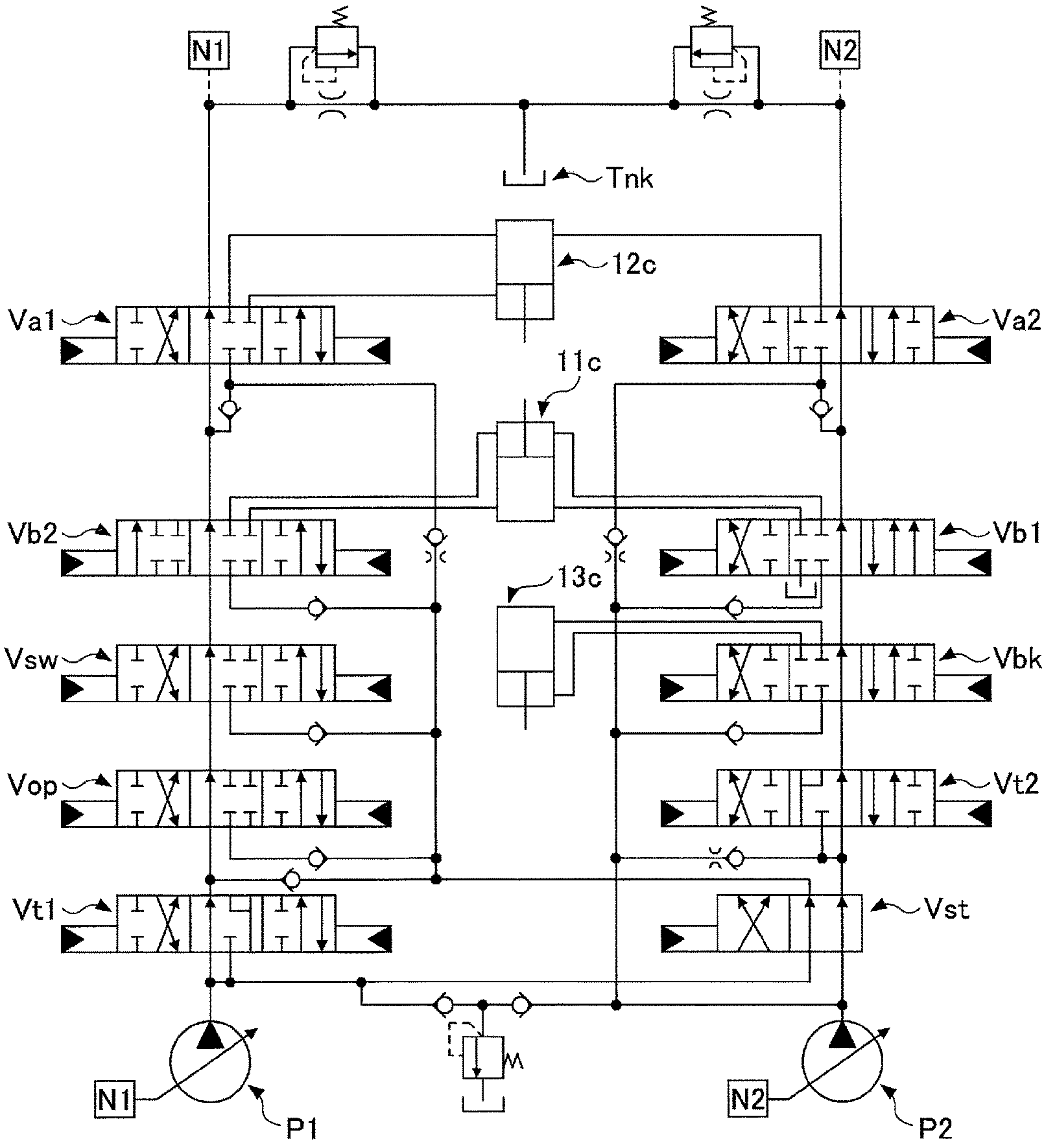
FIG. 3 is a hydraulic circuit diagram for describing another example of a hydraulic circuit of a construction machine.

FIG. 3 illustrates another example of a hydraulic circuit of a construction machine. In the hydraulic circuit of FIG. 3, a bleed opening (e.g., Sbo of FIG. 6) can be provided to each spool of a direction control valve (e.g., Va1 of FIG. 3). In other words, the construction machine including the hydraulic circuit of FIG. 3 can perform bleed-off control by changing the opening area of the bleed opening.

In the construction machine including the hydraulic circuit of FIG. 3, due to the bleed opening provided in the spool of the direction control valve, pressure loss of the pressure oil passing the center bypass passage may increase compared to the hydraulic circuit of the present invention (FIG. 2).

Further, with the construction machine including the hydraulic circuit of FIG. 3, pressure loss of the pressure oil passing the direction control valve may occur even in a case where the bleed opening of the direction control valve is open to its upper limit. That is, with the construction machine including the hydraulic circuit of FIG. 3, the internal passage of the direction control valve is designed to have its opening narrowed. Therefore, even in a case where the bleed opening of the direction control valve is open to its upper limit, pressure loss of the pressure oil passing the center bypass passage may increase compared to the case of the hydraulic circuit of the present invention (FIG. 2).

Further, with the direction control valve of the hydraulic circuit of FIG. 3, the length of the direction control valve is increased in its longitudinal direction because the bleed opening is provided in the spool of the direction control valve. That is, with the direction control valve of the hydraulic circuit of FIG. 3, due to the bleed opening provided in the spool of the direction control valve, the direction control valve is large and is difficult to manufacture compared to the case of the hydraulic circuit of the present invention (FIG. 2).

<Control Device of Construction Machine)

The control device 30 of the construction machine 100 of this embodiment uses a controller 30C (FIG. 2) being mounted for controlling the entire movement of the construction machine 100. The controller 30C (control device 30) is an apparatus that instructs movements to each of the configurations of the construction machine 100 and controls the movements of each of the configurations. The controller 30C (control apparatus 30) may be configured as a arithmetic processing device including, for example, a CPU (Central Processing Unit) and a memory.

The controller 30C of this embodiment controls the movement of a regulator R (R1, R2) based on information input to the construction machine 100 (e.g., operation amount of the operation lever, operation information pertaining to operation direction). Thereby, the discharge amount of the hydraulic pump P (P1, P2) is controlled by the regulator R.

Further, the controller 30C uses the remote control valve and the like to generate remote control pressure based on information input to the construction machine 100. Then, the controller 30C uses a remote control circuit to input the generated remote control pressure to the direction control valve (e.g., Vt1). Thereby, the direction control valve can switch the spool position and control the hydraulic oil to be supplied to the hydraulic actuator by using the input remote control pressure.

Further, the controller 30C of this embodiment changes the pressure of the pressure oil of the pilot pump Pp (Pp1, Pp2) to be input to the bleed-off valve Vbo (Vbo1, Vbo2). Thereby, the bleed-off valve Vbo can change its opening degree by using the input pressure. Further, the bleed-off valve Vbo can control the flow amount of the pressure oil that is returned to the hydraulic oil tank by changing the opening degree.

Accordingly, with the hydraulic circuit 20 of the construction machine 100 of the above-described embodiment of the present invention, the pressure oil discharged from the hydraulic pump P can be supplied downstream of the center bypass passage RC by using the first internal passage of the direction control valve without performing bleed-off control with the direction control valve. Thus, the pressure loss of the pressure oil passing the center bypass passage RC can be reduced.

Further, with the hydraulic circuit 20 of the construction machine 100 according to the embodiment of the present invention, bleed-off control can be performed downstream of the center bypass passage RC by using the bleed-off valve Vbo provided downstream of the center bypass passage RC without having to perform bleed-off control with the direction control valve (without providing a bleed opening in each direction control valve). Thereby, with the hydraulic circuit 20 of the construction machine 100 according to this embodiment, the pressure loss of the pressure oil passing the center bypass passage RC can be reduced because the opening area of the internal passage (e.g., first internal passage) of the direction control valve can be increased compared to the case where bleed-off control is performed by each of the multiple direction control valves.

Further, with the hydraulic circuit 20 of the construction machine 100 according to the embodiment of the present invention, the size of the direction control valve can be reduced in its longitudinal direction because the direction control valve does not include a bleed opening. Therefore, with the hydraulic circuit 20 of this embodiment, size reduction of the direction control valve can be achieved and manufacturing thereof can be simplified compared to a case of a hydraulic circuit including a bleed opening.

A working example of the present invention is described by using an example of a construction machine 100E.

<Configuration of Construction Machine>, <Hydraulic Circuit of Construction Machine>, and <Control Device of Construction Machine>

Because a configuration and the like of the construction machine 100E of this working example are basically the same as those of the construction machine 100 of the embodiment, explanation thereof is omitted.

<Internal Passage of Direction Control Valve>

Figure 4A:
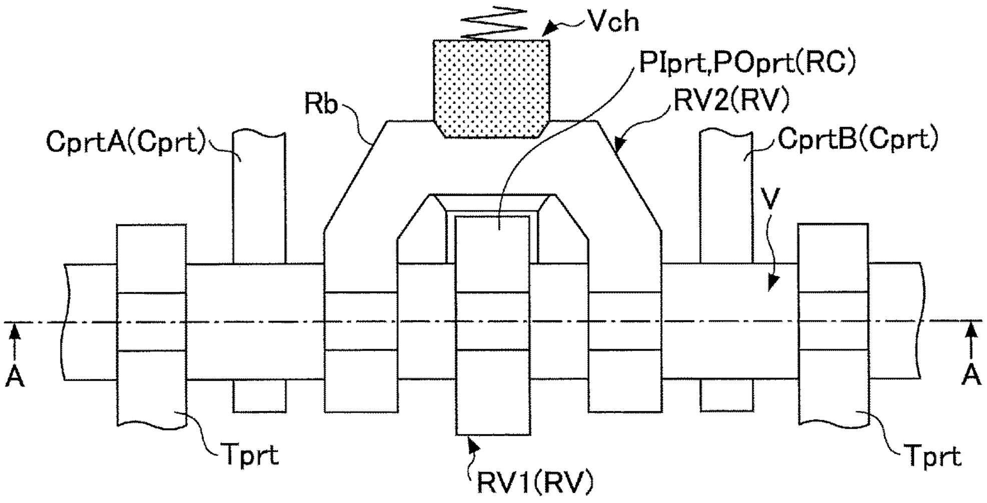
FIGS. 4A-4C are schematic diagrams for describing an example of a direction control valve of a hydraulic circuit according to an embodiment of the present invention.
Figure 4B:
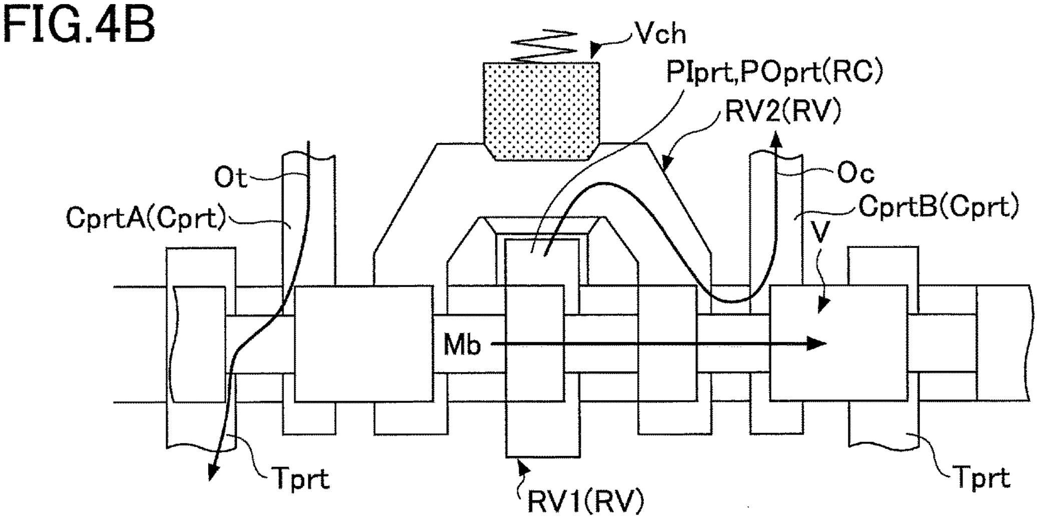
Figure 4C:
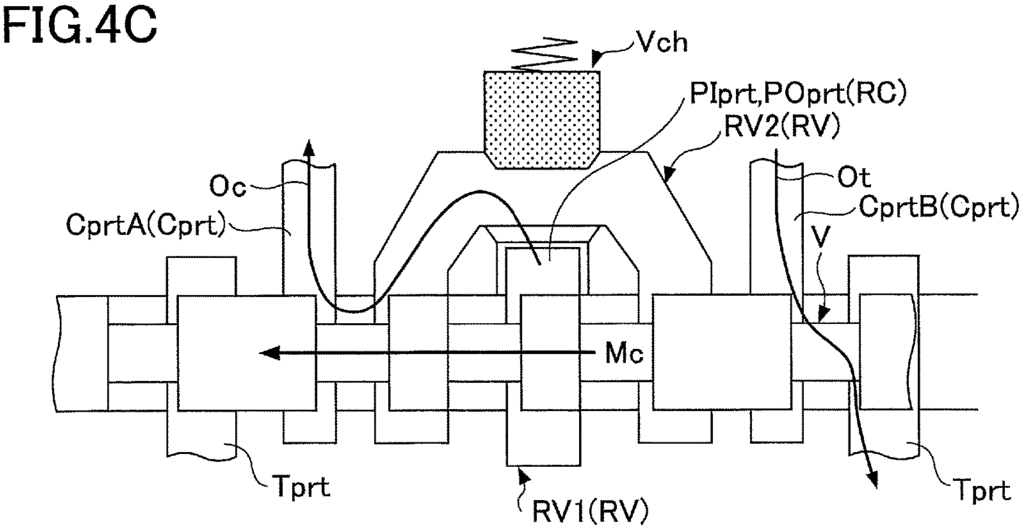
Figure 5:
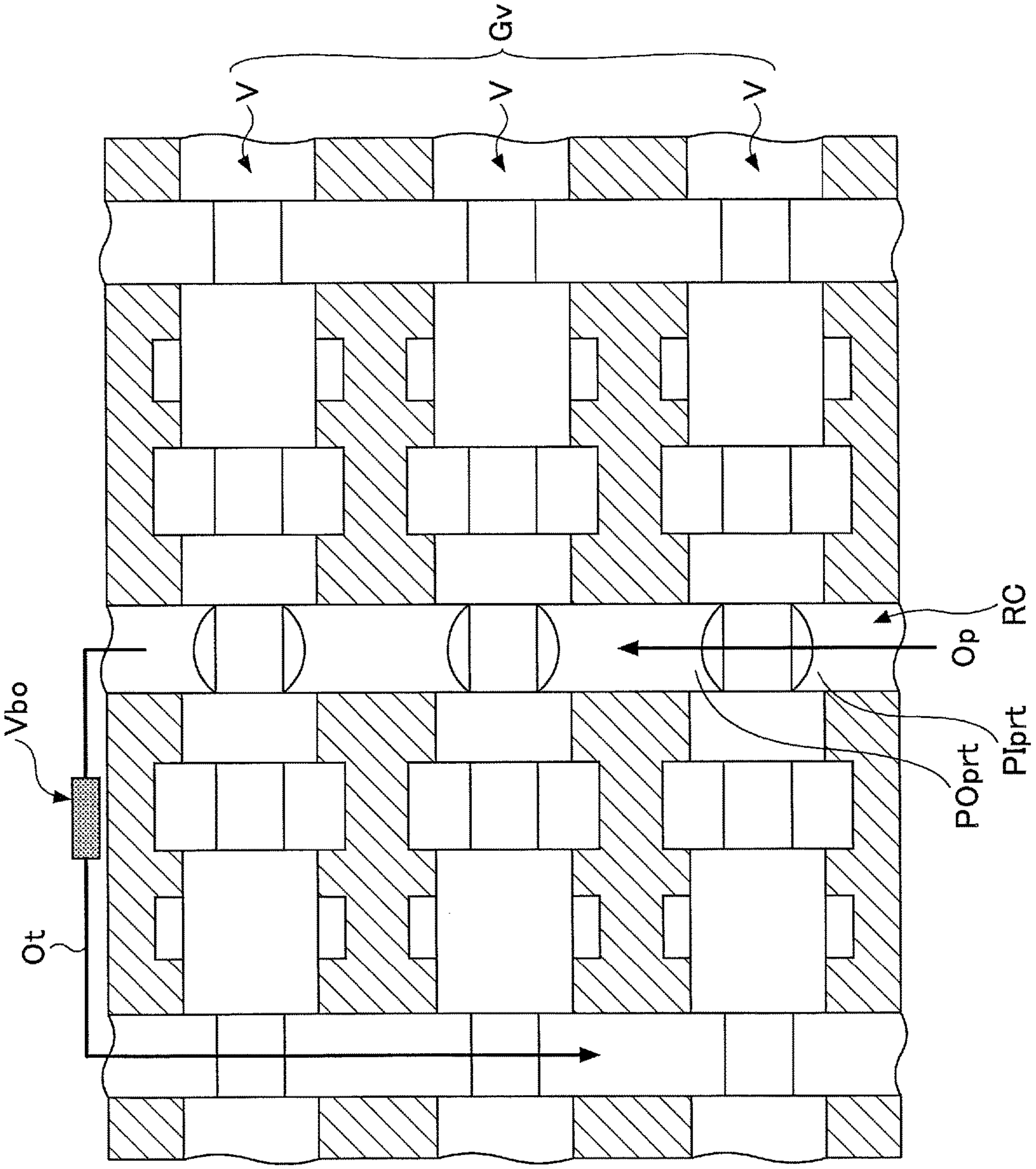
FIG. 5 is a schematic cross-sectional view for describing an example of a cross section (cross section along AA of FIG. 4A) of a direction control valve of a hydraulic circuit according to an embodiment of the present invention.

A schematic view of a configuration of a direction control valve (control valve) provided in the hydraulic circuit 20 of the construction machine 100E of this working example is illustrated in FIGS. 4A-4C.

As illustrated in FIG. 4A, the direction control valve V of the hydraulic circuit 20 according to the working example of the present invention includes an inlet port Plprt supplied with pressure oil via the center bypass passage RC, an outlet port POprt from which the pressure oil supplied from the inlet port PlPrt flows out to the center bypass passage RC, a cylinder port Cprt that supplies the pressure oil supplied from the direction control valve V to the hydraulic cylinder, and a tank port Tprt that discharges the pressure oil discharged from the hydraulic cylinder to the hydraulic oil tank.

As illustrated in FIG. 4B, in the direction control valve V of this working example, the pressure oil (hydraulic oil) Oc from the center bypass passage RC is supplied from the cylinder port CprtB to the hydraulic cylinder (e.g., 11*c* in FIGS. 1 and 2) via a check valve (e.g., non-return valve) Vch and the second internal passage RV2 during the spool displacement (Mb). In this case, the pressure oil (hydraulic oil) discharged from the hydraulic cylinder to the cylinder port CprtA is discharged from the tank port Tprt to the hydraulic oil tank. As illustrated in FIG. 4C, the pressure oil (hydraulic oil) Oc supplied from the center bypass passage is supplied from the cylinder port CprtA to the hydraulic cylinder via the check valve Vch and the second internal passage RV2 during the spool displacement (Mb). In this case, the pressure oil (hydraulic oil) discharged from the hydraulic cylinder to the cylinder port CprtB is discharged from the tank port Tprt to the hydraulic oil tank.

As illustrated in FIG. 4A, the hydraulic circuit 20 of the construction machine 100*e* according to the working example of the present invention can increase the opening area of the internal passage RV1 of the direction control valve V because bleed-off control is not performed with the direction control valve V (no bleed opening being provided in the direction control valve V). Thus, because the opening area of the internal passage RV1 of the direction control valve V can be increased, pressure loss of the pressure oil passing the center bypass passage RC can be reduced.

Further, the hydraulic circuit 20 of the construction machine 100E of this working example can function as a parallel passage that is formed by the center bypass passage RC and the multiple first internal passages RV1 (direction control valves V). Therefore, the hydraulic circuit 20 of this working example can reduce the size of the direction control valve V (reduce the size of the spool in its axial direction and radial direction) without having to provide a separate parallel passage. The hydraulic circuit 20 of this working example can reduce the size of, for example, the bridge passage Rb (FIG. 4A).

The hydraulic circuit 20 of the construction machine 100E according to the working example of the present invention allows the pressure oil to flow out to the center bypass passage RC by using the direction control valve group Gv. More specifically, the hydraulic circuit 20 including the direction control valve group Gv (multiple direction control valves V) can form a parallel passage with the center bypass passage RC and the first internal passages that have substantially the same passage area regardless of the spool position of the direction control valve. In the hydraulic circuit 20, the pressure oil Op supplied from the inlet port Plprt flows out to the outlet port POprt via the first internal passage RV1 of the direction control valve V and flows out to the center bypass passage RC.

Thereby, the hydraulic circuit 20 of the construction machine 100E according to the working example of the present invention can have the shape of its center bypass passage RC simplified because there is no need to provide multiple bleed openings to each of the spools of the multiple direction control valves V (direction control valve group Gv). Further, the hydraulic circuit 20 of the working example can reduce pressure loss of the pressure oil passing the center bypass passage RC because the bending parts and the like of the center bypass passage RC can be reduced.

Hence, the hydraulic circuit 20 of the construction machine 100E according to the working example of the present invention can attain the similar effects as those of the hydraulic circuit 20 of the construction machine 100 according to the embodiment of the present invention.

Further, with the hydraulic circuit 20 of the construction machine 100E according to the working example of the present invention, a passage constituted by the center bypass passage RC and the first internal passages RV (direction control valves V) can function as a parallel passage by serially providing the multiple direction control valves V to the center bypass passage RC. Further, with the hydraulic circuit 20 of the working example, a separate parallel passage need not be provided and the size of the direction control valve V can be reduced because the passage constituted by the center bypass passage RC and the multiple first internal passages RV1 functions as a parallel passage. Thereby, the hydraulic circuit 20 of the construction machine 100E according to the working example of the present invention can attain advantageous effects pertaining to size-reduction, manufacture-simplification, and cost reduction of the entire construction machine 100E.

Hence, with the construction machine for performing bleed-off control according to the above-described embodiment of the present invention, pressure loss of pressure oil passing a center bypass passage can be reduced.

Further, the present invention is not limited to the above-described embodiments and working examples of the hydraulic circuit of the construction machine, but variations and modifications may be made without departing from the scope of the present invention.

The invention claimed is:

1. A direction control valve group for a construction machine that controls an amount of pressure oil supplied to a hydraulic actuator from a hydraulic pump that discharges the pressure oil, the direction control valve group includes a plurality of directional control valves, wherein a first directional control valve comprising:

a cylinder port that supplies the pressure oil to the hydraulic actuator;

a bridge passage that is switchably connected and disconnected to the cylinder port according to a change in position of a first spool; and an internal passage that supplies the pressure oil discharged from the hydraulic pump to the bridge passage;

wherein the first spool is provided in the internal passage.

2. The direction control valve group for the construction machine as claimed in claim 1, wherein the internal passage has substantially the same passage area regardless of the position of the first spool.

3. The direction control valve group for the construction machine as claimed in claim 1, further comprising:

a second directional control valve includes a second spool that is provided in the internal passage upstream or downstream of the first spool in tandem with the first spool.

4. The direction control valve group for the construction machine as claimed in claim 3, wherein the internal passage is connected to the second spool when the internal passage is connected to the cylinder port in response to the change in position of the first spool.

5. The direction control valve group for the construction machine as claimed in claim 4, further comprising:

a tank port arranged at an outer side of the cylinder port;

wherein the cylinder port is switchably connected and disconnected to the tank port.

6. The direction control valve group for the construction machine as claimed in claim 1, further comprising:

a bleed-off valve;

wherein the bleed-off valve performs bleed-off control on the pressure oil that is supplied via the internal passage by changing an opening area of the bleed-off valve.

7. The direction control valve group for the construction machine as claimed in claim 6, wherein the bleed-off valve is arranged between the internal passage and a tank.

8. The direction control valve group for the construction machine as claimed in claim 6, wherein the bleed-off valve and the first spool change the opening area in response to operation information input to the construction machine.

9. The direction control valve group for the construction machine as claimed in claim 1, wherein two cylinder ports are provided as the cylinder port at two sides of the internal passage.

10. The direction control valve group for the construction machine as claimed in claim 9, wherein when one of the two cylinder ports is connected to the internal passage, the other one of the two cylinder ports is disconnected from the internal passage.

11. The direction control valve group for the construction machine as claimed in claim 1, wherein a flow amount of the pressure oil that is supplied from the internal passage to the cylinder port is controlled according to the position of the first spool.

12. The direction control valve group for the construction machine as claimed in claim 1, wherein the internal passage and the bridge passage are connected by only one passage at every position of the first spool.

13. A hydraulic shovel comprising:

a direction control valve group for a construction machine that controls an amount of pressure oil supplied to a hydraulic actuator from a hydraulic pump that discharges the pressure oil;

wherein the direction control valve group includes a plurality of directional control valves, wherein at least one of the plurality of directional control valves comprising:

a cylinder port that supplies the pressure oil to the hydraulic actuator;

a bridge passage that is switchably connected and disconnected to the cylinder port according to a change in position of a spool; and an internal passage that supplies the pressure oil discharged from the hydraulic pump to the bridge passage;

wherein the spool is provided in the internal passage.

14. The hydraulic shovel as claimed in claim 13, wherein the plurality of direction control valves are provided in tandem with a center bypass passage.

15. The hydraulic shovel as claimed in claim 14, wherein the internal passage is a part of the center bypass passage.

16. The hydraulic shovel as claimed in claim 13, comprising:

a first hydraulic pump;

a second hydraulic pump;

a first center bypass passage to which pressure oil discharged from the first hydraulic pump is supplied;

a second center bypass passage to which pressure oil discharged from the second hydraulic pump is supplied;

a first direction control valve group for the construction machine including a plurality of direction control valves that are provided in the first center bypass passage; and a second direction control valve group for the construction machine including a plurality of direction control valves that are provided in the second center bypass passage.

17. The hydraulic shovel as claimed in claim 16, further comprising:

a first direction control valve that is provided in the first direction control valve group for the construction machine;

a second direction control valve that is provided in the second direction control valve group for the construction machine; and a boom cylinder that drives a boom;

wherein hydraulic oil is supplied to the boom cylinder by the first direction control valve and the second direction control valve.

18. The hydraulic shovel as claimed in claim 13, wherein the internal passage and the bridge passage are connected by only one passage at every of the first spool.

* * * * *